United States Patent
Charnesky et al.

(10) Patent No.: US 10,393,005 B2
(45) Date of Patent: Aug. 27, 2019

(54) FUEL EFFICIENT POWERTRAIN COOLING SYSTEMS AND RADIATOR MODULES

(75) Inventors: Scott P. Charnesky, Birmingham, MI (US); Gregory J. Fadler, Commerce Township, MI (US); Thomas K. Lockwood, Fenton, MI (US); Kevin A. Golsch, Waterford, MI (US)

(73) Assignee: GM GLOBAL TECHNOLOGY OPERATIONS, INC., Detroit, MI (US)

( * ) Notice: Subject to any disclaimer, the term of this patent is extended or adjusted under 35 U.S.C. 154(b) by 2739 days.

(21) Appl. No.: 12/817,971

(22) Filed: Jun. 17, 2010

(65) Prior Publication Data

US 2011/0308763 A1   Dec. 22, 2011

(51) Int. Cl.
| | |
|---|---|
| *F01P 1/00* | (2006.01) |
| *F01P 7/12* | (2006.01) |
| *B60H 1/32* | (2006.01) |
| *B60K 11/04* | (2006.01) |
| *B60K 11/08* | (2006.01) |
| *F01P 7/16* | (2006.01) |

(52) U.S. Cl.
CPC .............. *F01P 7/12* (2013.01); *B60H 1/3227* (2013.01); *B60H 1/3229* (2013.01); *B60K 11/04* (2013.01); *B60K 11/085* (2013.01); *F01P 7/165* (2013.01); *Y02T 10/88* (2013.01)

(58) Field of Classification Search
CPC ........... F01P 7/164; F01P 7/12; B60H 1/3227; B60H 1/32366
USPC ........... 62/125, 126, 89, 239, 241, 243, 244; 180/68.1, 68.2, 68.4; 165/41, 44, 98, 165/101, 103
See application file for complete search history.

(56) References Cited

U.S. PATENT DOCUMENTS

| | | | |
|---|---|---|---|
| 2,155,439 A | | 4/1939 | Morrison |
| 4,186,693 A | * | 2/1980 | Thien et al. ............... 123/41.12 |
| 4,485,624 A | | 12/1984 | Melchior |
| 4,523,657 A | | 6/1985 | Kooyumjian |
| 4,938,303 A | | 7/1990 | Schaal et al. |

(Continued)

FOREIGN PATENT DOCUMENTS

| | | |
|---|---|---|
| DE | 3136673 A1 | 5/1982 |
| DE | 3201246 A1 | 7/1983 |

(Continued)

OTHER PUBLICATIONS

German Office Action, dated Nov. 23, 2011, for German Patent Application No. 10 2011 104 113.7.

(Continued)

*Primary Examiner* — Brian M King
(74) *Attorney, Agent, or Firm* — Lorenz & Kopf, LLP (57) ABSTRACT

Embodiments of a powertrain cooling system and embodiments of a radiator module are provided for deployment onboard a vehicle. In one embodiment, the powertrain cooling system includes a first airflow path, a second airflow path, a primary radiator core positioned in the first airflow path, an auxiliary radiator core position in the second airflow path, and a first airflow valve positioned in the second airflow path upstream of the auxiliary radiator core. The first airflow valve is movable between a closed position wherein the first airflow valve impedes airflow to the auxiliary radiator core and an open position.

19 Claims, 6 Drawing Sheets

(56) References Cited

U.S. PATENT DOCUMENTS

| | | |
|---|---|---|
| 5,205,484 A | 4/1993 | Susa et al. |
| 5,215,044 A * | 6/1993 | Banzhaf et al. ............ 123/41.29 |
| 5,429,179 A * | 7/1995 | Klausing ..................... 165/240 |
| 5,566,745 A | 10/1996 | Hill et al. |
| 6,354,096 B1 * | 3/2002 | Siler et al. ..................... 62/183 |
| 6,390,217 B1 | 5/2002 | O'Brien et al. |
| 6,527,333 B2 | 3/2003 | Hewitt et al. |
| 6,604,515 B2 * | 8/2003 | Marsh et al. ................. 123/563 |
| 6,854,544 B2 | 2/2005 | Vide |
| 7,004,245 B2 * | 2/2006 | Abdeljawad ................. 165/203 |
| 7,080,704 B1 | 7/2006 | Kerner et al. |
| 7,147,038 B2 | 12/2006 | Taguchi |
| 7,275,378 B2 | 10/2007 | Errington et al. |
| 7,296,645 B1 | 11/2007 | Kerner et al. |
| 7,484,584 B1 | 2/2009 | Kerner et al. |
| 7,497,287 B2 | 3/2009 | Kunikata et al. |
| 8,015,954 B2 | 9/2011 | Kardos |
| 8,100,096 B2 | 1/2012 | Cölker |
| 2006/0095178 A1 | 5/2006 | Guilfoyle et al. |
| 2006/0102399 A1 | 5/2006 | Guilfoyle et al. |
| 2008/0185125 A1 * | 8/2008 | Prior .............................. 165/86 |
| 2008/0257286 A1 * | 10/2008 | Harich et al. ............... 123/41.12 |
| 2009/0050385 A1 | 2/2009 | Guilfoyle et al. |
| 2009/0266312 A1 | 10/2009 | Preiss |
| 2010/0025006 A1 * | 2/2010 | Zhou .............................. 165/41 |
| 2010/0147611 A1 * | 6/2010 | Amano et al. ............... 180/68.1 |

FOREIGN PATENT DOCUMENTS

| | | |
|---|---|---|
| DE | 4104093 A1 | 8/1992 |
| DE | 19506475 A1 | 9/1995 |
| DE | 10341700 A1 | 4/2005 |
| DE | 102006062116 A1 | 6/2007 |
| EP | 0084091 A1 | 7/1983 |
| EP | 0499071 A1 | 8/1992 |
| EP | 1199451 A2 | 4/2002 |
| GB | 2120379 A | 11/1983 |
| GB | 2343740 A | 5/2000 |
| JP | 8021240 A | 1/1996 |
| JP | 2006290063 A | 10/2006 |

OTHER PUBLICATIONS

Chinese Patent & Trademark Office, Chinese Office Action for Application No. 201110163757.9 dated Jan. 30, 2013.

German Patent and Trade Mark Office, Office Action for German Patent Application No. 10 2011 104 113.7, dated Jul. 14, 2014.

* cited by examiner

FUEL EFFICIENT POWERTRAIN COOLING SYSTEMS AND RADIATOR MODULES

TECHNICAL FIELD

The following disclosure relates generally to vehicular cooling systems and, more particularly, to embodiments of a fuel efficient powertrain cooling system and radiator module.

BACKGROUND

Most modern vehicles are equipped with a liquid cooling system (referred to herein as a "powertrain cooling system") that continually circulates a coolant fluid (e.g., antifreeze) to dissipate excess heat generated by the vehicle's internal combustion engine and to provide other heat-transfer functions (e.g., heating of other engine fluids; rapid warming of the engine upon start-up; warming of a heater core included within the vehicle's heating, ventilation, and air conditioning system; etc.). A conventional powertrain cooling system typically includes, amongst other components, a radiator core having a plurality of cooling fins interspersed with a plurality of metal tubes to form a generally rectangular unit, which is mounted between the vehicle's grill and engine compartment. During engine operation, coolant heated by the engine housing (e.g., the engine block and the cylinder head) is supplied to an inlet of the radiator core by an engine-driven centrifugal pump. The heated coolant flows through the radiator tubes and conductively transfers heat to the cooling fins, which are then convectively cooled by exposure to ram airflow received through one or more openings in the vehicle grill and/or by forced airflow directed over the radiator core by a neighboring fan. The airflow convectively heated by the radiator core is then routed to the vehicle's engine compartment to provide additional cooling thereto. After flowing through the radiator core, the coolant fluid is again circulated through the engine housing to repeat the cooling cycle.

Due to the presence of rubber hoses and other heat-sensitive components within the engine compartment, powertrain cooling systems have traditionally been designed to limit the maximum outlet temperature of the radiator; i.e., the maximum temperature to which the radiator convectively heats airflow to which it is exposed. Radiator cores have also traditionally been designed to enable a single radiator core to satisfy a wide range of heat rejection needs. In particular, single radiator cores have traditionally been designed to dissipate relatively small heat loads produced under everyday use conditions (e.g., moderate ambient temperatures, light loading of the vehicle, inactivity or minor demands placed on the vehicle's air conditioning (A/C) system, etc.), as well as relatively large heats loads generated under extreme use conditions (e.g., high ambient temperatures, heavy loading of the vehicle, vehicle towing, major demands placed on the vehicle's A/C system, etc.).

To ensure that the radiator outlet temperature does not become undesirably high under extreme use conditions, conventional powertrain cooling systems are typically designed to intake a substantial volume of airflow through the vehicle grill during forward movement of the vehicle. By exposing the radiator core to such a large volume of airflow, a substantial amount of heat may be rejected (i.e., transferred from the radiator core to the ambient airflow) without causing a significant rise in air temperature immediately downstream of the radiator core. However, the intake of such a large volume of airflow through the vehicle grill results in the exertion of significant aerodynamic drag on the vehicle and a corresponding reduction in fuel economy. Certain powertrain cooling system have been developed that include one or more airflow valves (e.g., shutter-type valve assemblies) that can be closed when the vehicle is operating under everyday use conditions to impede airflow through the vehicle's grill and thereby reduce aerodynamic drag on the vehicle. However, such powertrain cooling systems are still limited in certain respects and generally fail to provide optimal heat rejection-to-fuel consumption ratios over a wide range of operating conditions.

There thus exists an ongoing need to provide embodiments of a fuel efficient powertrain cooling system and a radiator module that achieves a relatively high heat rejection-to-fuel consumption ratio. Ideally, embodiments of such a fuel efficient radiator module would enable the rapid warming of a vehicle's internal combustion engine without requiring rapid warming loops employed by many conventional powertrain cooling systems. Other desirable features and characteristics of the present invention will become apparent from the subsequent Detailed Description and the appended Claims, taken in conjunction with the accompanying Drawings and this Background.

BRIEF SUMMARY

Embodiments of a powertrain cooling system are provided for deployment onboard a vehicle. In one embodiment, the powertrain cooling system includes a first airflow path, a second airflow path, a primary radiator core positioned in the first airflow path, an auxiliary radiator core position in the second airflow path, and a first airflow valve positioned in the second airflow path upstream of the auxiliary radiator core. The first airflow valve is movable between a closed position wherein the first airflow valve impedes airflow to the auxiliary radiator core and an open position.

Embodiments of a radiator module are further provided for deployment within a vehicle including a static airflow opening and a variable airflow opening therein. In one embodiment, the radiator module includes a primary radiator core and an auxiliary radiator core coupled to the primary radiator core. The primary radiator core is configured to receive airflow from the static airflow opening when the radiator module is deployed within the vehicle, and the auxiliary radiator core is configured to receive airflow from the first variable airflow opening when the radiator module is deployed within the vehicle. The auxiliary radiator core has cooling efficiency less than the cooling efficiency of the primary radiator core.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
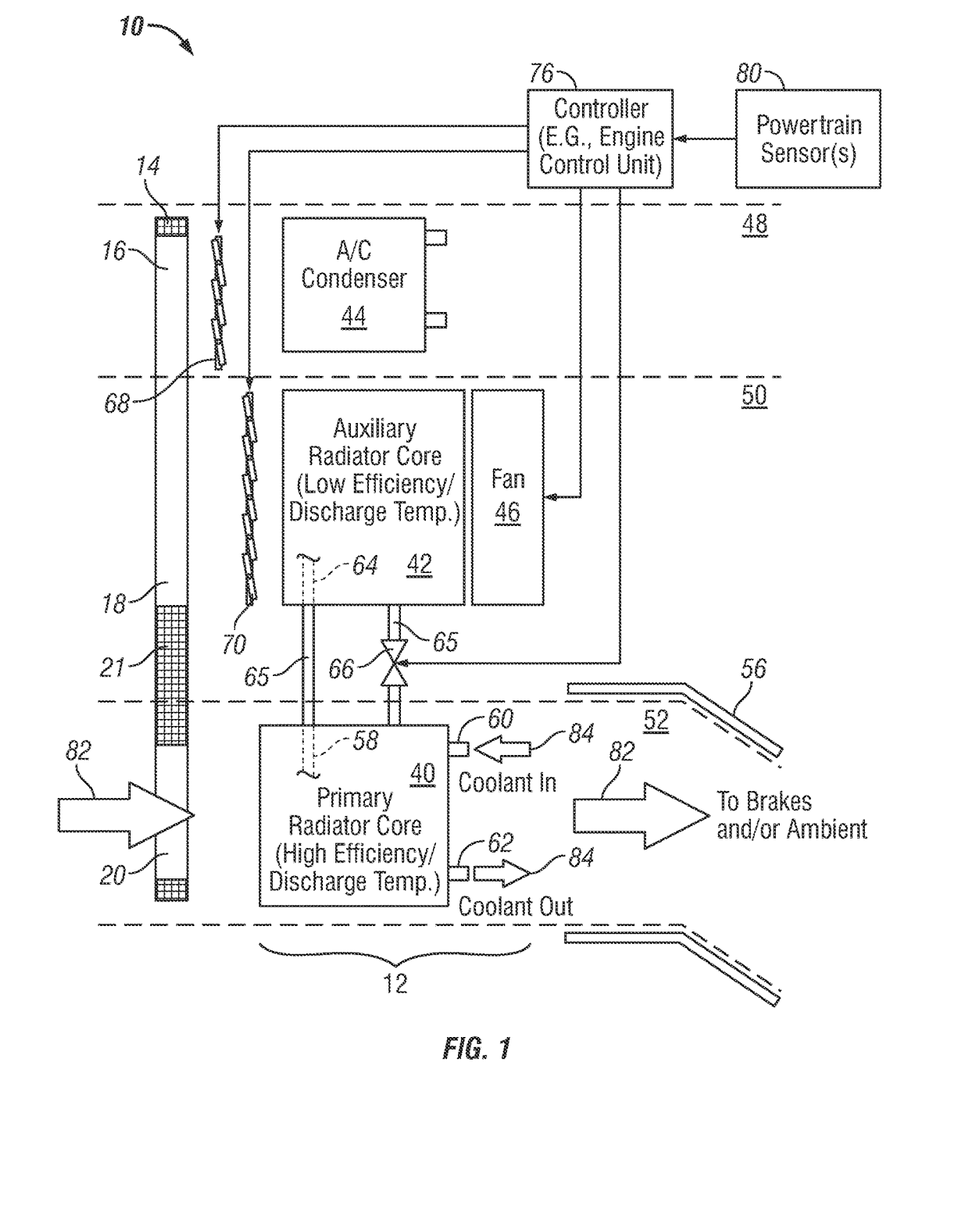
FIGS. 1, 2, and 3 are functional diagrams of a vehicular powertrain cooling system in a fuel efficient cooling mode, an increased cooling capacity/air conditioning off mode, and an increased cooling capacity/air conditioning on mode, respectively, in accordance with a first exemplary embodiment.
Figure 2:
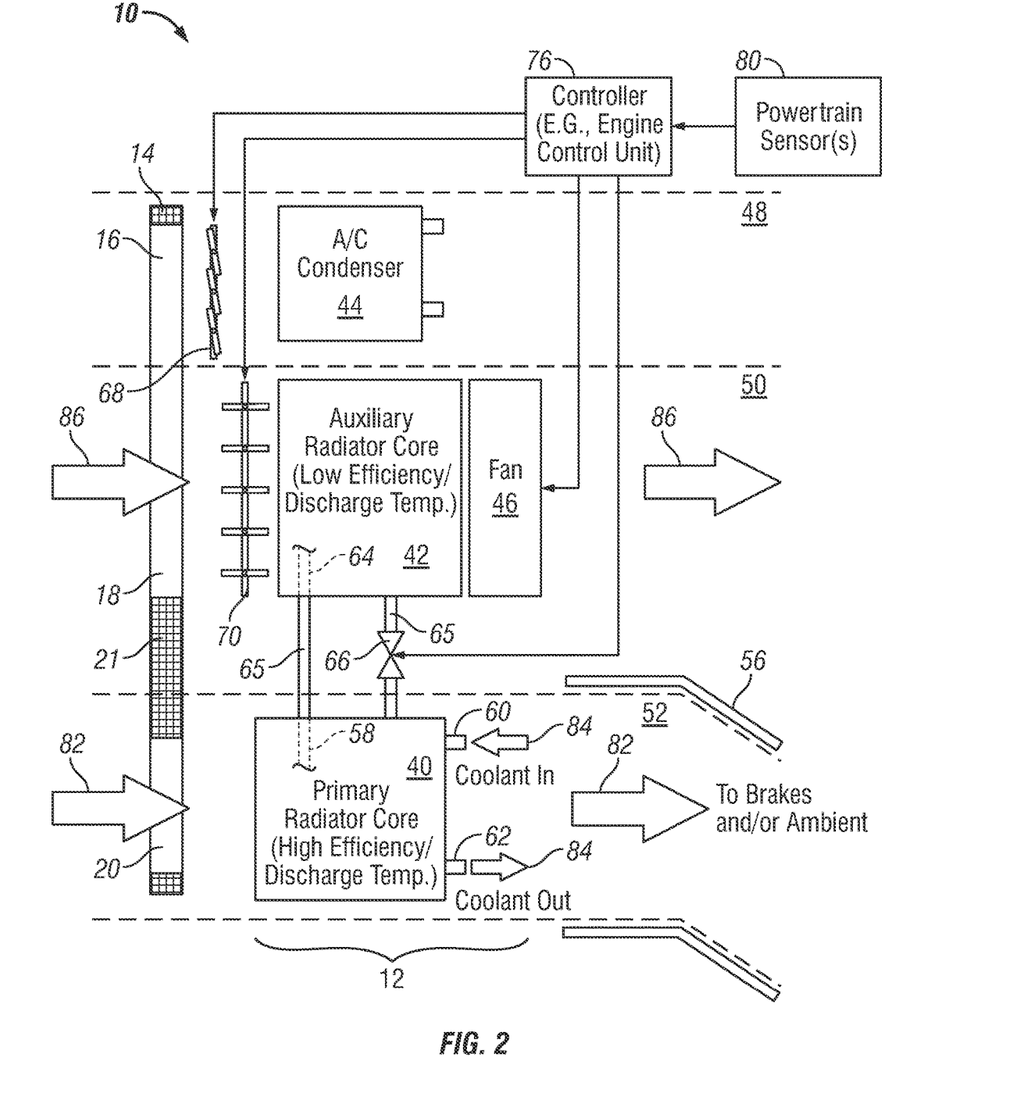
Figure 3:
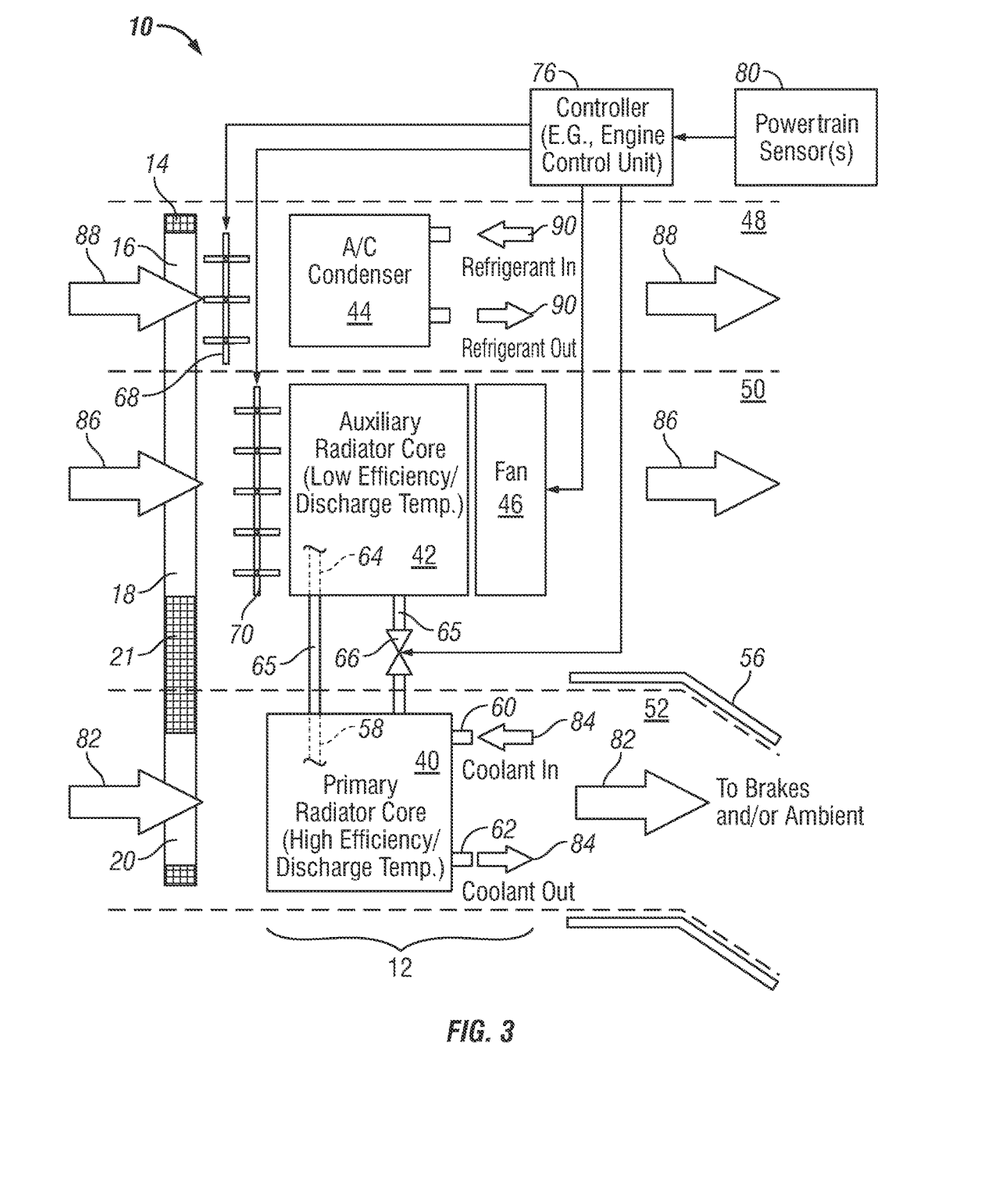

FIGS. 1, 2, and 3 are functional diagrams of a vehicular powertrain cooling system 10 including a fuel efficient radiator module 12 in accordance with an exemplary embodiment of the present invention. As will be explained more fully below, powertrain cooling system 10 is operable in at least two modes: (i) a fuel efficient cooling mode suitable for normal or "everyday" usage, and (ii) an increased capacity cooling mode suitable for usage under "extreme use" conditions requiring dissipation of relatively high heat loads. In many embodiments, powertrain cooling system 10 will be operable in a fuel efficient cooling mode and a number of increased capacity cooling modes. In the illustrated exemplary embodiment, specifically, powertrain cooling system 10 is operable in a fuel efficient cooling mode (shown in FIG. 1), an increased cooling capacity/air conditioning off mode (shown in FIG. 2), and an increased cooling capacity/air conditioning on mode (shown in FIG. 3). Additional embodiments of powertrain cooling system 10 may be operable in still further cooling modes each suitable for usage under varying sets of conditions.

Vehicular powertrain cooling system 10 is deployed onboard a vehicle including a leading fascia structure 14 having at least one static airflow opening and at least one variable airflow opening therein. In the exemplary embodiment illustrated in FIGS. 1-3, a first variable airflow opening 16, a second variable airflow opening 18, and a static airflow opening 20 are provided through leading fascia structure 14. Static airflow opening 20 is provided through a lower portion of leading fascia structure 14, and variable airflow openings 16 and 18 are each formed through an upper portion of leading fascia structure 14. A wall 21 partitions static airflow opening 20 and variable airflow openings 16 and 18. This example notwithstanding, the airflow openings may not be partitioned and the relative positioning of the airflow openings may vary in alternative embodiments of powertrain cooling system 10.

As utilized herein, the term "static airflow opening" denotes an opening that receives airflow therethrough that is not actively modulated, in any substantial manner, by an airflow valve deployed onboard the vehicle. It will be noted, however, that the volume and rate of ram airflow received through the static airflow opening may be affected by factors external to powertrain cooling system 10, such as the velocity, acceleration, or deceleration of the vehicle. In contrast, the term "variable airflow opening" denotes an opening that receives airflow therethrough that is actively modulated, under certain conditions, by at least one airflow valve deployed onboard the vehicle. In most cases, the airflow valve (or valves) utilized to modulate airflow received through the at least one variable airflow opening will be mounted adjacent (e.g., immediately behind) its corresponding variable airflow opening; however, the possibility that an airflow valve can be positioned further upstream or downstream of its corresponding variable airflow opening is by no means precluded.

Figure 4:
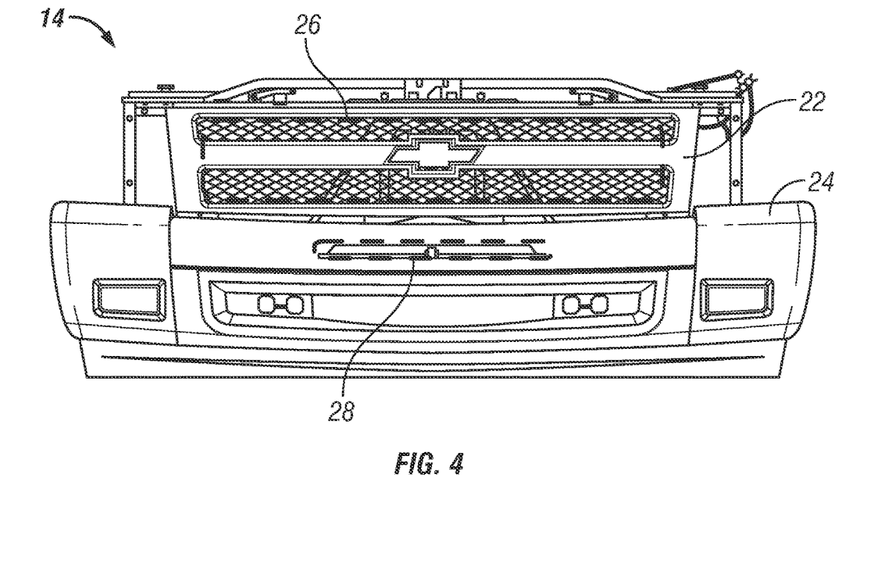
FIGS. 4 and 5 are isometric views of first and second exemplary implementations, respectively, of a leading fascia structure having a static airflow opening and at least one variable airflow opening therein.
Figure 5:
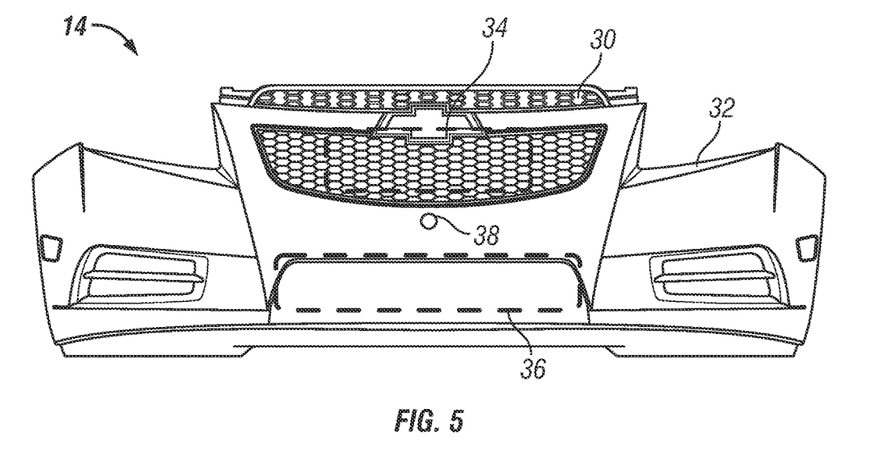

Leading fascia structure 14 can include any number of structural elements, such as one or more radiator grille assemblies, front bumper members, hood members, and the like. In accordance with a first exemplary implementation of vehicular powertrain cooling system 10, FIG. 4 illustrates leading fascia structure 14 as including a radiator grille assembly 22 positioned above and affixed to (e.g., bolted to) a front bumper member 24. In this case, a static airflow opening (e.g., static airflow opening 20 shown in FIGS. 1-3) may be provided through an upper central portion of front bumper member 24, as indicated in FIG. 4 by dashed box 26; and one or more variable airflow openings (e.g., variable airflow openings 18 and 20 shown in FIGS. 1-3) may be provided through grille assembly 22, as indicated in FIG. 4 by dashed box 28. In accordance with a second exemplary implementation of powertrain cooling system 10, FIG. 5 illustrates leading fascia structure 14 as including a radiator grille assembly 30 and a front bumper member 32, which are integrally formed as single unit. In this case, the static airflow opening may be provided through a lower central portion of front bumper member 32, as indicated in FIG. 5 by dashed box 34; and the variable airflow opening or openings may be provided through grille assembly 30, as indicated in FIG. 5 by dashed box 36.

The static airflow opening is preferably, although not necessarily, positioned at or near the stagnation point (i.e., the location at which velocity of airflow over leading fascia structure 14 is zero during forward movement of the vehicle) to maximize the energy of airflow received through the static airflow opening and to minimize aerodynamic drag on the vehicle. For example, the static airflow opening may be formed immediately above or below the stagnation point and is preferably located closer to the stagnation point than is the variable airflow opening or openings. With reference to the exemplary implementation of leading fascia structure 14 shown in FIG. 5, specifically, the static airflow opening (dashed box 36) is formed through front bumper member 32 immediately above the stagnation point, which is represented in FIG. 5 by circular marker 38.

Fuel efficient radiator module 12 includes a primary radiator core 40, an auxiliary radiator core 42, an air conditioning (A/C) condenser 44, and a fan 46. Primary radiator core 40, auxiliary radiator core 42, and A/C condenser 44 are positioned to receive airflow through static airflow opening 20, through variable airflow opening 18, and through variable airflow opening 16, respectively. For example, radiator module 12 may be positioned immediately behind leading fascia structure 14 such that primary radiator core 40, auxiliary radiator core 42, and A/C condenser 44 generally align with static airflow opening 20, variable airflow opening 18, and variable airflow opening 16, respectively, as taken along the longitudinal axis of the vehicle. In the exemplary embodiment illustrated in FIGS. 1-3, primary radiator core 40, auxiliary radiator core 42, and A/C condenser 44 are disposed in a vertically stacked arrangement; however, primary radiator core 40, auxiliary radiator core 42, and A/C condenser 44 can be arranged in any relative positioning in three dimensional space including, for example, a side-by-side arrangement. Furthermore, while it is preferred that fan 46 is positioned adjacent (e.g., immediately behind) auxiliary radiator core 42, this need not always be the case. While conveniently packaged as a single module, and while primarily described herein as being packaged as a single module, radiator core 40, radiator core 42, A/C condenser 44, and fan 46 may not be packaged as a single module in alternative embodiments of powertrain cooling system 10.

As indicated in FIGS. 1-3 by a series of dashed lines, a first airflow path 48 extends through variable airflow opening 16 and A/C condenser 44; a second airflow path 50 extends through variable airflow opening 18, auxiliary radiator core 42, and fan 46; and a third airflow path extends through static airflow opening 20 and primary radiator core 40. In a preferred embodiment, A/C condenser 44 resides in airflow path 48 and substantially outside of airflow paths 50 and 52; auxiliary radiator core 42 and fan 46 reside in airflow path 50 and substantially outside of airflow paths 48 and 52; and primary radiator core 40 resides in airflow path 52 and substantially outside of airflow paths 48 and 50. This notwithstanding, A/C condenser 44, auxiliary radiator core 42, fan 46, and primary radiator core 40 may share, at least in part, one or more airflow paths in alternative embodiments. For example, in embodiments wherein vehicular powertrain cooling system 10 includes a single variable airflow opening, a single airflow path may originate from the variable airflow opening and extend through both auxiliary radiator core 42 and A/C condenser 44.

Primary radiator core 40 and auxiliary radiator core 42 may be fabricated as a single, integral unit or, instead, as separate structures. In either case, primary radiator core 40 is designed to have a higher cooling efficiency than does auxiliary radiator core 42. For example, relative to auxiliary radiator core 42, primary radiator core 40 may have a larger cumulative cooling surface than does auxiliary radiator core 42 due to, for example, an increased number of cooling fins and/or an increased cooling fin size. A non-exhaustive list of other factors that can be varied to increase the cooling efficiency of primary radiator core 40 relative to that of auxiliary radiator core 42 includes variations in the overall radiator core size, variations in the characteristics (e.g., size, shape, disposition, etc.) of the coolant flow channels provided within the radiator core, and variations in the materials from which the radiator cores are manufactured.

Due to its relatively high cooling efficiency, primary radiator core 40 is capable of rejecting a given amount of heat to a reduced volume of airflow relative to auxiliary radiator core 42 and conventional radiator cores of the type described above. As a corollary, the outlet temperature of primary radiator core 40 (i.e., the temperature to which core 40 convectively heats airflow) will necessarily be higher than the outlet temperature of auxiliary radiator core 42 and conventional radiators. The airflow heated by primary radiator core 40 during operation of powertrain cooling system 10 may consequently reach temperatures unsuitable for venting to the engine compartment. Thus, in a preferred embodiment, powertrain cooling system 10 is configured to direct airflow exhausted by primary radiator core 40 around the vehicle's engine compartment; e.g., as indicated in FIGS. 1-3, a duct member 56 may be positioned downstream of primary radiator core 40 to direct the hot air exhausted by core 40 under the vehicle body, over the vehicle hood, or to the vehicle's sides. In further embodiments, the airflow exhausted by core 40 can be directed to other components heated to even higher temperatures during operation of the vehicle, such as the vehicle brakes.

With continued reference to the exemplary embodiment illustrated in FIGS. 1-3, primary radiator core 40 includes a main coolant inlet 60, a main coolant outlet 62, and an internal coolant flow passage 58 (partially shown in phantom in FIGS. 1-3). Auxiliary radiator core 42 likewise includes an internal coolant flow passage 64, which is fluidly coupled to coolant flow passage 58 of primary radiator core 40 by, for example, connecting conduits 65. A coolant shut-off valve 66 is fluidly coupled between coolant flow passage 58 and coolant flow passage 64 and enables the flow of coolant fluid to be regulated from primary radiator core 40 to auxiliary radiator core 42 during operation of powertrain cooling system 10. More specifically, when powertrain cooling system 10 is in the fuel efficient cooling mode (FIG. 1), coolant shut-off valve 66 resides in a closed position to prevent coolant flow from primary radiator core 40 to auxiliary radiator core 42. However, when powertrain cooling system 10 transitions to an increased capacity cooling mode (FIGS. 2 and 3), shut-off valve 66 opens to allow the exchange of coolant between radiator cores 40 and 42. The manner in which powertrain cooling system 10 transitions from the fuel efficient cooling mode (FIG. 1) to an increased capacity cooling mode (FIGS. 2 and 3) is described in detail below.

Vehicular powertrain cooling system 10 further includes a controller 76; a first airflow valve 68 operably coupled to a first input of controller 76, and a second airflow valve 70 operably coupled to a second input of controller 76. Airflow valve 68 is fluidly coupled between variable airflow opening 16 and A/C condenser 44; that is, airflow valve 68 is positioned downstream of (e.g., immediately behind) variable airflow opening 16 and upstream of (e.g., immediately in front of) A/C condenser 44. Similarly, airflow valve 70 is fluidly coupled between variable airflow opening 18 and auxiliary radiator core 42; that is, airflow valve 70 is positioned downstream of (e.g., immediately behind) variable airflow opening 18 and upstream of (e.g., immediately in front of) auxiliary radiator core 42. Airflow valves 68 and 70 can assume any form suitable for modulating the airflow received by A/C condenser 44 and auxiliary radiator core 42, respectively. In a preferred embodiment, and as generically illustrated in FIGS. 1-3, airflow valve 68 and 70 each assume the form of a shutter-type valve assembly (also commonly referred to as a "lamella-type valve assembly" or, when collectively referring to the shutter members, "lamellae").

As noted above, controller 76 is operably coupled to airflow valves 68 and 70 and, more specifically, to a valve actuator included within each valve 68 and 70 (not shown in FIGS. 1-3 for clarity). During operation of vehicular powertrain cooling system 10, controller 76 commands airflow valve 68 to move between at least a closed position (FIGS. 1 and 2) and an open position (FIG. 3). Controller 76 likewise commands airflow valve 70 to move between at least a closed position (FIG. 1) and an open position (FIGS. 2 and 3). In certain embodiments, controller 76 may also command airflow valves 68 and 70 to move amongst a plurality of intermediate positions to provide even greater regulation of airflow to A/C condenser 44 and auxiliary radiator core 42, respectively; however, this is by no means necessary. Controller 76 may comprise, or be associated with, any suitable number of individual microprocessors, power supplies, storage devices, vehicular control units, and other standard components known in the art suitable for commanding airflow valves 68 and 70 to move between at least open and closed positions in this manner and for performing the other control functions described below. Furthermore, controller 76 may include or cooperate with any number of software programs or instructions designed to carry-out the various methods, process tasks, calculations, and below-described control functions. In a preferred embodiment, controller 76 assumes the form of an Engine Control Unit.

Controller 76 is configured to command airflow valves 68 and 70 to move from the closed position in which each valve normally resides to an open position as a heat load placed powertrain cooling system 10 increases above a predetermined threshold. To allow controller 76 to monitor the heat load placed on powertrain cooling system 10, powertrain cooling system 10 is further equipped with one or more powertrain sensors 80, which are operatively coupled to controller 76 and which monitor parameters indicative of the heat load placed on cooling system 10. Powertrain sensors 80 conveniently include at least one sensor that monitors a parameter indicative of engine temperature and preferably include a temperature sensor (e.g., a radiator top tank temperature sensor) that monitors engine coolant temperature. Powertrain sensors 80 may also include a sensor that monitors the temperature and/or pressure of the vehicle's A/C system; e.g., powertrain sensors 80 may include an A/C head pressure sensor that monitors the head pressure of the vehicle's A/C system to ensure that the pressure within the A/C system does not approach levels at which the A/C compressor (not shown) could be damaged during compression. A non-exhaustive list of still further sensors that may be included within powertrain sensors 80 includes an ambient temperature sensor, a vehicle speed sensor, a turbocharger temperature sensor, and an A/C activation sensor.

Powertrain cooling system 10 normally operates in the fuel efficient cooling mode shown in FIG. 1. In the fuel efficient cooling mode, airflow is received through static airflow opening 20 and flows over primary radiator core 40 (represented in FIG. 1 by arrows 82). By comparison, airflow through variable airflow openings 16 and 18 and to A/C condenser 44 and auxiliary radiator core 42, respectively, is substantially blocked by airflow valves 68 and 70, which each reside in a closed position. As further indicated in FIG. 1 by arrows 84, a pump, such as an engine-driven centrifugal pump, circulates coolant fluid through primary radiator core 40. The coolant received through main coolant inlet 60 has been heated after being routed through the vehicle's internal combustion engine (e.g., the engine block and cylinder head). The heated coolant flows through the internal plumbing of primary radiator core 40, conductively transfer heat to cooling fins included within radiator core 40, and then exits primary radiator core 40 via main coolant outlet 62 in a cooled state. The airflow received through static airflow opening 20 convectively cools the heated cooling fins of core 40, and is then directed to the vehicle brakes or ambient by duct member 56. In the fuel efficient cooling mode, coolant shut-off valve 66 preferably resides in a closed position; thus, coolant is prevented from flowing through auxiliary radiator core 42 in the fuel efficient cooling mode.

The characteristics of powertrain cooling system 10, and in particular the flow area of static airflow opening 20 and the efficiency factor of primary radiator core 40, are preferably chosen such that the fuel efficient cooling mode (FIG. 1) provides sufficient cooling capacity to satisfy the cooling needs generated when the vehicle operates under everyday use conditions of the type described above (e.g., when the ambient temperature is low or moderate, when the vehicle is only lightly loaded, etc.). Due to the high efficiency of primary radiator core 40, the volume of airflow required to convectively cool core 40 and thereby satisfy the heat rejection needs during such typical usage conditions is significantly less than (e.g., approximately ¼) the volume of airflow required to satisfy heat rejection needs typically required under extreme usage conditions, as described more fully below. In a preferred embodiment, static airflow opening 20 is designed to intake only the volume of airflow required to satisfy typical usage cooling needs at a predetermined speed. Thus, relative to conventional powertrain cooling systems, powertrain cooling system 10 intakes a significantly reduced volume of airflow when operating under everyday usage conditions. As a result, aerodynamic drag on the vehicle can be greatly reduced, and the overall fuel efficiency of the vehicle can be increased. The predetermined speed may vary depending upon the region in which the vehicle equipped within powertrain cooling system 10 will be utilized; in the United States, the predetermined speed is preferably selected to be a common highway speed, such as 70 miles per hour.

When the fuel efficient cooling mode (FIG. 1) is insufficient to satisfy the heat dissipation needs currently required, powertrain cooling system 10 transitions to an increased capacity cooling mode. In particular, controller 76 may receive data from powertrain sensors 80 indicating that additional cooling is needed (e.g., due to overheating of the engine, as indicated by an increase in coolant temperature), and then place powertrain cooling system 10 in an increased capacity cooling mode. If the vehicle's A/C system is inactive, controller 76 places powertrain cooling system 10 in the increased cooling capacity/air conditioning off mode shown in FIG. 2; and, if the vehicle's A/C system is active, controller 76 places powertrain cooling system 10 in the increased cooling capacity/air conditioning on mode shown in FIG. 3.

To transition from the fuel efficient cooling mode (FIG. 1) to the increased cooling capacity/air conditioning off mode (FIG. 2), controller 76 performs the following functions. First, controller 76 commands coolant shut-off valve 66 to move into an open position to thereby allow the exchange of coolant between auxiliary radiator core 42 and primary radiator core 40. Second, controller 76 commands airflow valve 70 to move into an open position. As indicated in FIG. 2 by arrows 86, the opening of airflow valve 70 permits air to flow through variable airflow opening 18 and over auxiliary radiator core 42 thus cooling radiator core 42 and the coolant conducted therethrough. In this manner, auxiliary radiator core 42 is effectively activated and provides additional convective cooling of the circulating coolant fluid to satisfy the additional heat rejection demands placed on powertrain cooling system 10. In certain embodiments, controller 76 may also energize fan 46 when powertrain cooling system 10 first enters in the increased cooling capacity/air conditioning off mode (FIG. 2) to force additional airflow over auxiliary radiator core 42 and further increase overall cooling capacity. In further embodiments, controller 76 may not energize fan 46 until additional criteria are met (e.g., when powertrain sensors 80 indicate that further cooling capacity is required); and, in still further embodiments, fan 46 may be independently controlled by a temperature-actuated switch. After being heated by auxiliary radiator core 42, the airflow exhausted by core 42 may then be routed to the engine compartment for additional convective cooling.

To transition from the fuel efficient cooling mode shown in FIG. 1 to the increased cooling capacity/air conditioning on mode shown in FIG. 3, controller 76 performs the functions described above in conjunction with the increased cooling capacity/air conditioning off mode shown in FIG. 2; i.e., controller 76 commands coolant shut-off valve 66 to move into an open position, commands airflow valve 70 to move into an open position, and possibly energizes fan 46. In addition, as indicated in FIG. 3 by arrows 88, controller 76 commands airflow valve 68 to move into an open position to allow airflow through variable airflow opening 16 and to A/C condenser 44. Refrigerant is also now circuited through A/C condenser 44 (indicated in FIG. 3 by arrows 90). Thus, in the increased cooling capacity/air conditioning on mode shown in FIG. 3, A/C condenser 44 is effectively activated and cools the refrigerant now flowing therethrough to enable proper operation of the vehicle's A/C system. As with the airflow heated by auxiliary radiator core 42, the airflow heated by A/C condenser 44 (i.e., the airflow flowing along airflow path 48) may then be directed into the vehicle's engine compartment to provide further cooling thereto.

There has thus been provided a generalized exemplary embodiment of a fuel efficient powertrain cooling system and radiator module suitable for deployment on a vehicle. Notably, the above-described exemplary powertrain cooling system normally operates in a fuel efficient mode wherein a reduced baseline volume of airflow is received through the front of the vehicle to reduce aerodynamic drag on the vehicle, while also meeting the cooling demands characteristic of normal or "everyday" usage. Further, in the above-described exemplary embodiment, the powertrain cooling system transitions to at least one increased capacity cooling mode to provide additional cooling when the heat rejection needs of the vehicle increase as indicated by, for example, one or more powertrain sensors deployed onboard the vehicle. As a further advantage, embodiments of the above-described powertrain cooling system may also render unnecessary the rapid warming loops commonly employed by conventional powertrain cooling systems to warm the vehicle engine upon start-up. Again referring to FIGS. 1-3, upon engine start-up, the engine coolant (and possibly other fluids) circulated through primary radiator core 40 will warm relatively rapidly due to the reduced thermal mass and increased efficiency of primary radiator core 40, as compared to conventional radiator cores. As a result, a vehicle equipped with powertrain cooling system 10 can achieve the benefits of efficient engine warming, including an improvement in engine efficiency and a reduction in emissions, without requiring the additional plumbing and other components typically employed by rapid warming loops.

Figure 6:
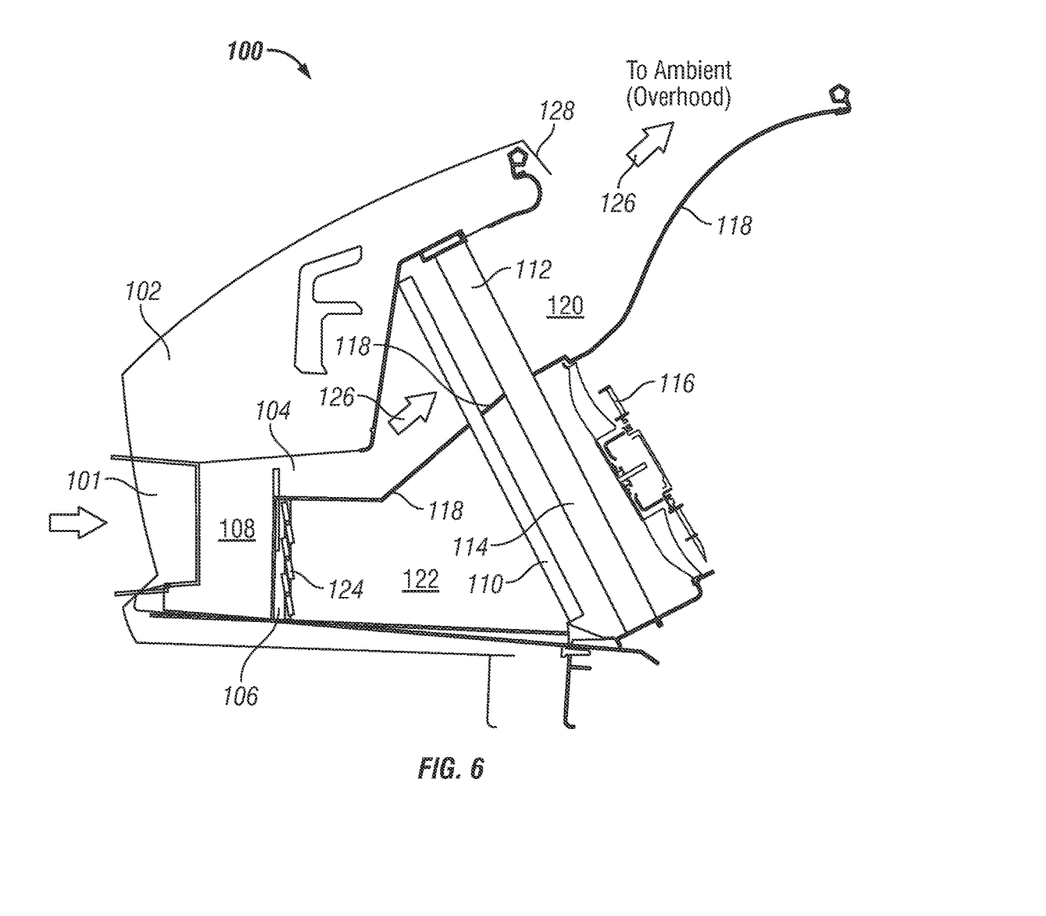
FIGS. 6 and 7 are generalized cross-sectional views of a powertrain cooling system in a fuel efficient cooling mode and an increased capacity cooling mode, respectively, in accordance with a further exemplary embodiment.
Figure 7:
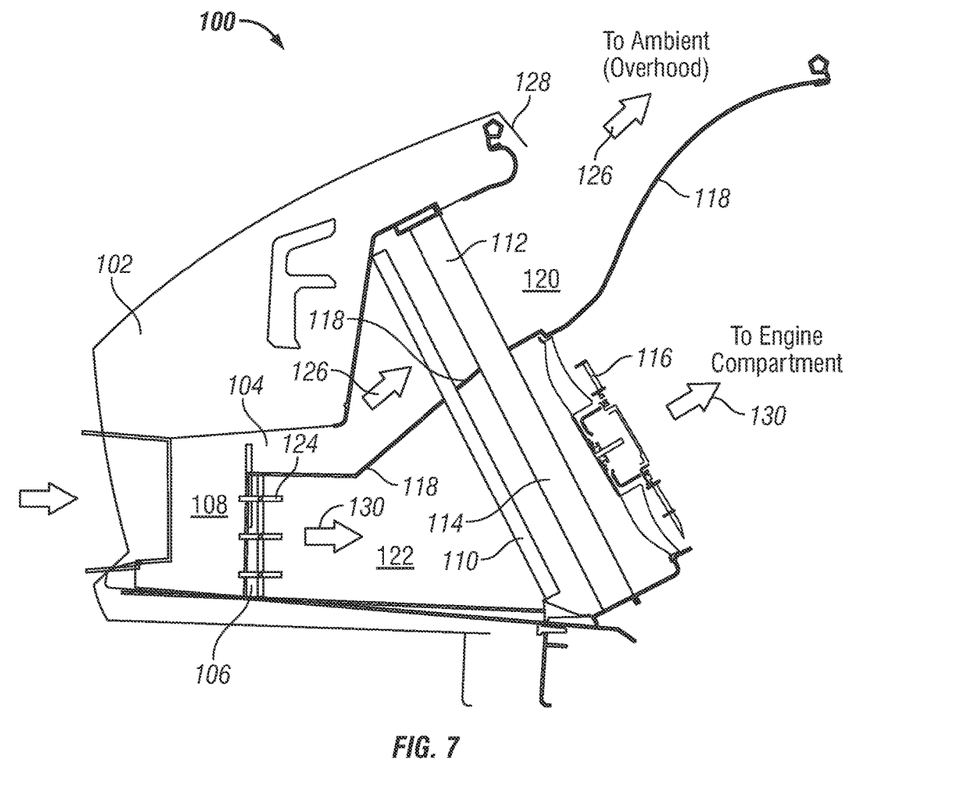

FIGS. 6 and 7 are generalized cross-sectional views of a powertrain cooling system 100 in a fuel efficient cooling mode and an increased capacity cooling mode, respectively, in accordance with a further exemplary embodiment. Vehicular powertrain cooling system 100 is deployed onboard a vehicle including a leading fascia structure 102 having an internal cavity 108 and an air intake 101, which bifurcates into a static airflow opening 104 and a variable airflow opening 106. Powertrain system 100 includes an A/C condenser 110, a primary radiator core 112, an auxiliary radiator core 114, and a fan 116. In this particular example, primary radiator core 112 and auxiliary radiator core 114 are integrally formed as a single unit, which is disposed downstream (e.g., positioned immediately behind) A/C condenser 110. As was the case previously, primary radiator core 112 is designed to have a higher cooling efficiency than does auxiliary radiator core 114. Fan 116 is mounted within internal cavity 108 downstream of auxiliary radiator core 114. Fan 116 is thus fluidly coupled in series with auxiliary radiator core 114 and in parallel with primary radiator core 112. One or more internal walls 118 and possibly other structural members (e.g., seals) partition internal cavity 108 into two airflow paths, namely, a first airflow path 120 and a second airflow path 122. As indicated in FIGS. 6 and 7, an upper portion of A/C condenser 110 and primary radiator core 112 are positioned in airflow path 120 and substantially outside of airflow path 122; while a lower portion of A/C condenser 110, auxiliary radiator core 114, and fan 116 are positioned in airflow path 122 and substantially outside of airflow path 120.

Powertrain cooling system 100 further includes an airflow valve 124, such as a shutter-type valve assembly. Airflow valve 124 is positioned in second airflow path 122 upstream of A/C condenser 110, auxiliary radiator core 114, and fan 116. Valve 124 is movable between a closed position (FIG. 6) and an open position (FIG. 7) wherein valve 124 impedes airflow to the lower portion of A/C condenser 110, auxiliary radiator core 114, and fan 116. As indicated in FIGS. 6 and 7 by arrows 126, airflow is permitted along airflow path 120 and through static airflow opening 104, through the upper portion of A/C condenser 110, and through primary radiator core 112 in both the fuel efficient cooling mode (FIG. 6) and the increased capacity cooling mode (FIG. 7). Powertrain cooling system 100 is preferably designed (e.g., the flow area of static airflow opening 104 and the cooling efficiency of primary radiator core 112) to satisfy the typical cooling requirements of the host vehicle. Notably, given the increased efficiency of primary radiator core 112, less air is required to dissipate heat absorbed by the coolant fluid circulated through core 112. As a result, the flow area of static airflow opening 104 may be decreased by design, aerodynamic drag on vehicle may be reduced, and the overall fuel efficiency of the vehicle may be increased when powertrain cooling system operates in the fuel efficient mode (FIG. 6). However, due to its increased efficiency, primary radiator core 112 may heat airflow to a temperature unsuitable for venting to the engine compartment. Thus, as indicated in FIGS. 6 and 7, airflow heated by primary radiator core 112 may be exhausted through an over-hood vent 128. In further embodiments, airflow heated by primary radiator core 112 may be directed to ambient in other manners (e.g., through an under-vehicle vent) or routed to the vehicle brakes to provide additional cooling thereto.

When additional cooling capacity is required, powertrain cooling system 100 transitions into the increased capacity cooling mode shown in FIG. 7. In particular, a controller (not shown) commands airflow valve 124 to move into an open position (FIG. 7), and airflow is consequently permitted through the lower portion of A/C condenser 110, through auxiliary radiator core 114, and through fan 116 (indicated in FIG. 7 by arrows 130). If not already circulated through core 114, a coolant is now circulated through auxiliary radiator core 114. Auxiliary radiator core 114 thus provides additional cooling of the circulated coolant fluid to satisfy the increased heat rejection demands placed on powertrain cooling system 100. Fan 116 may also be energized when powertrain cooling system 100 first transitions into the increased capacity cooling mode (FIG. 7) or at a later juncture to increase the rate of airflow over auxiliary radiator core 114 and, thus, augment the convective cooling thereof. Airflow heated by auxiliary radiator core 114 may then be routed to the engine compartment to provide additional convective cooling, as previously-described.

There has thus been described multiple exemplary embodiments of a fuel efficient powertrain cooling system including at least one airflow valve. While, in the above-described examples, the airflow valve (or valves) was described as being movable between a closed position and an open position, it is emphasized that the airflow valve (or valves) can be movable between an plurality of intermediate positions to modulate the airflow received by one or more auxiliary radiator cores, A/C condensers, or other heat exchangers. In addition, the volume of airflow to which such components are exposed, the heat dissipation provided thereby, and the aerodynamic drag exerted on the vehicle can also be affected by controlling the duration of time the airflow valve (or valves) remain in an open position. While the above-described exemplary powertrain cooling systems were operable in a particular number of cooling modes (e.g., two to three cooling modes) and included a certain number of airflow paths (e.g., two to three airflow paths), additional embodiments of the powertrain cooling system may be operable in a greater number of cooling modes and may include any suitable number of airflow paths.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims. Numerical terms, such as "first," "second," and "third," have been utilized in the foregoing Detailed Description to indicate an order of introduction of like elements or devices. Such terms may also be utilized in the subsequent Claims to reflect the order of introduction of like elements or devices. However, as the order of introduction of like elements or devices may vary from the Detailed Description to the Claims, so too may the usage of such numerical terms.

What is claimed is:

1. A powertrain cooling system for deployment onboard a vehicle including an engine compartment, the powertrain cooling system comprising:
   a first airflow path;
   a second airflow path;
   a primary radiator core positioned in the first airflow path;
   an auxiliary radiator core positioned in the second airflow path; and
   a first airflow valve positioned in the second airflow path upstream of the auxiliary radiator core, the first airflow valve movable between a closed position wherein the first airflow valve impedes airflow to the auxiliary radiator core and an open position;
   wherein the cooling efficiency of the primary radiator core is greater than the cooling efficiency of the auxiliary radiator core such that the primary radiator core rejects a given amount of heat to a reduced volume of airflow as compared to the auxiliary radiator core, and wherein the first airflow path directs the airflow discharged by the primary radiator core around and not into the engine compartment.

2. A powertrain cooling system according to claim 1 wherein the first airflow valve normally resides in the closed position.

3. A powertrain cooling system according to claim 2 further comprising:
   a controller operatively coupled to the first airflow valve; and
   at least one powertrain sensor operably coupled to the controller and configured to provide to the controller data indicative of a heat load placed on the vehicle, the controller configured to cause the first airflow valve to move into an open position when the at least one powertrain sensor indicates that the heat load surpasses a predetermined threshold.

4. A powertrain cooling system according to claim 3 wherein the at least one powertrain sensor is configured to monitor engine coolant temperature.

5. A powertrain cooling system according to claim 3 wherein the vehicle further includes an air conditioning system, and wherein the at least one powertrain sensor is configured to monitor an air conditioning system pressure.

6. A powertrain cooling system according to claim 3 wherein the primary radiator core includes a first internal coolant flow passage, and wherein the auxiliary radiator core includes a second internal coolant flow passage fluidly coupled to the first internal coolant flow passage.

7. A powertrain cooling system according to claim 6 further comprising a coolant shut-off valve fluidly coupled between the first internal coolant flow passage and the second internal coolant flow passage, the coolant shut-off valve normally residing in a closed position.

8. A powertrain cooling system according to claim 7 wherein the controller is configured to cause the coolant shut-off valve to move into an open position when the at least one powertrain sensor indicates that the heat load surpasses the predetermined threshold.

9. A powertrain cooling system according to claim 1 wherein the primary radiator core resides substantially outside of the second airflow path, and wherein the auxiliary radiator core resides substantially outside of the first airflow path.

10. A powertrain cooling system according to claim 9 further comprising a fan positioned within the second airflow path and substantially outside of the first airflow path.

11. A powertrain cooling system according to claim 1 further comprising an air conditioning condenser positioned in the second airflow path proximate the auxiliary radiator core.

12. A powertrain cooling system according to claim 1 further comprising:
    a third airflow path;
    an air conditioning condenser positioned in the third airflow path; and
    a second airflow valve positioned in the third airflow path upstream of the air conditioning condenser and movable between a plurality of positions to modulate the airflow received by the air conditioning condenser during operation of the powertrain cooling system.

13. A powertrain cooling system according to claim 1 further comprising at least one airflow dividing structure configured to partition, at least in part, the first airflow path and the second airflow path.

14. A powertrain cooling system, comprising:
    a first airflow path;
    a second airflow path;
    a primary radiator core positioned in the first airflow path and substantially outside of the second airflow path; and
    an auxiliary radiator core positioned in the second airflow path and substantially outside of the first airflow path, the cooling efficiency of the primary radiator core greater than the cooling efficiency of the auxiliary radiator core wherein the powertrain cooling system is configured to be deployed aboard a vehicle having an engine compartment, and wherein the powertrain cooling system is configured to direct airflow heated by the primary radiator core around and not into the engine compartment and to direct airflow heated by the auxiliary radiator core into the engine compartment.

15. A powertrain cooling system according to claim 14 wherein the powertrain cooling system is operable in a fuel efficient cooling mode and at least one increased capacity cooling mode, and wherein the powertrain cooling system further comprises an airflow valve positioned in the second airflow path upstream of the auxiliary radiator core, the airflow valve residing: (i) in a closed position to substantially block airflow to the auxiliary radiator core in the fuel efficient cooling mode to reduce the amount of air flowing through the auxiliary radiator core, and (ii) in an open position to generally permit airflow to the auxiliary radiator core in the increased capacity cooling mode to increase the amount of air flowing through the auxiliary radiator core.

16. A radiator module for deployment within a vehicle including a static airflow opening and a variable airflow opening therein, the radiator module comprising:
   a primary radiator core configured to receive airflow from the static airflow opening when the radiator module is deployed within the vehicle; and
   an auxiliary radiator core coupled to the primary radiator core and configured to receive airflow from the variable airflow opening when the radiator module is deployed within the vehicle, the auxiliary radiator core having a cooling efficiency less than the cooling efficiency of the primary radiator core.

17. A radiator module according to claim 16 further comprising a fan fluidly coupled in series with the primary radiator core and in parallel with the auxiliary radiator core.

18. A powertrain cooling system according to claim 1 further comprising:
   a static airflow opening generally aligned with the primary radiator core, the first airflow path extending from the static airflow opening through the primary radiator core; and
   a variable airflow opening generally aligned with the auxiliary radiator core, the second airflow path extending from the variable airflow opening through the auxiliary radiator core.

19. A powertrain cooling system according to claim 14 wherein the powertrain cooling system is deployed onboard a vehicle having an engine compartment, and wherein the powertrain cooling system further comprises a duct downstream of the primary radiator core and configured to receive the heated airflow discharged therefrom, the duct directing the heated airflow discharged by the primary radiator core along a flow path bypassing the engine compartment.

* * * * *